United States Patent [19]
Kinutani et al.

[11] Patent Number: 6,112,737
[45] Date of Patent: Sep. 5, 2000

[54] WIRE SAW AND METHOD OF CUTTING WORK

[75] Inventors: Kazutomo Kinutani; Shigeo Kobayashi, both of Kanagawa; Etsuo Kiuchi, Gunma, all of Japan

[73] Assignee: Nippei Toyama Corporation, Tokyo, Japan

[21] Appl. No.: 09/099,951

[22] Filed: Jun. 19, 1998

[30] Foreign Application Priority Data

Jun. 19, 1997 [JP] Japan ................................. 9-162977

[51] Int. Cl.$^7$ ............................................. B28D 1/06
[52] U.S. Cl. .............................. 125/16.02; 125/16.02; 125/21; 83/651
[58] Field of Search ...................... 125/16.02, 21; 83/651

[56] References Cited

U.S. PATENT DOCUMENTS 5,052,366  10/1991  Matsukura ...................... 125/16.01

FOREIGN PATENT DOCUMENTS 196 38 990  3/1997  Germany .......................... B26D 7/01

Primary Examiner—David A. Scherbel
Assistant Examiner—Shantese McDonald
Attorney, Agent, or Firm—Sughrue, Mion, Zinn, Macpeak & Seas PLLC

[57] ABSTRACT

A wire saw which can improve a working accuracy is provided. When a wire goes to a rightward direction by a rotation of a moving motor, the wire is inclined in such a manner as to be moved toward a right and outer periphery from an inner portion of a work, and a cutting start point of the work becomes a point within the work. Further, when a wire goes to a leftward direction by a rotation of the moving motor, the wire is inclined in such a manner as to be moved toward a left and outer periphery from an inner portion of a work, and a cutting start point of the work becomes a point within the work. Then, the work is cut from the cutting start point by a sufficient slurry containing float abrasive grains supplied to a portion on the wire.

10 Claims, 6 Drawing Sheets

FIG. 9
FIG. 10
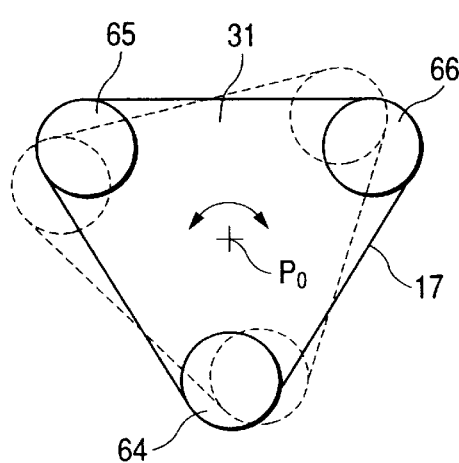
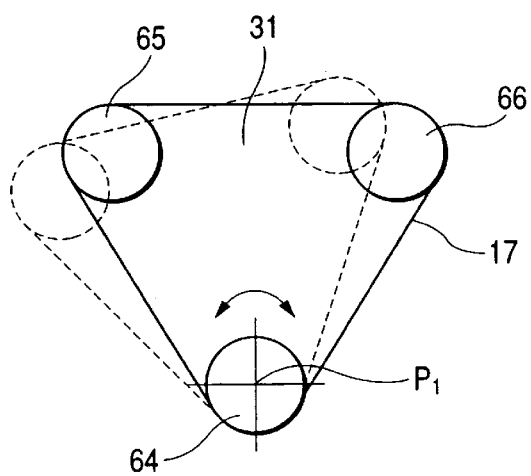
FIG. 11
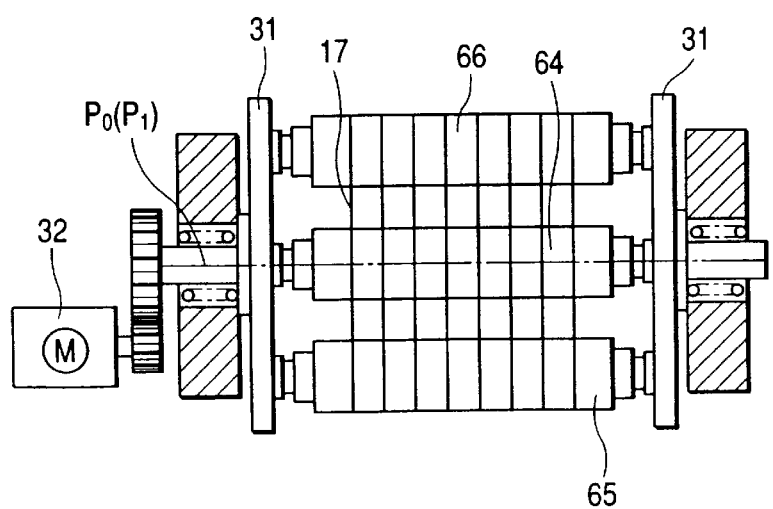

WIRE SAW AND METHOD OF CUTTING WORK

BACKGROUND OF THE INVENTION

The present invention relates to a wire saw for cutting/slicing a work made of a hard and brittle material such as a semiconductor material, a magnetic material and a ceramic.

In the wire saw, a plurality of working rollers are disposed at a predetermined interval, and a moving motor for normally and reversely rotating the working rollers is connected to the working rollers. Further, a plurality of annular grooves are formed on an outer periphery of each working rollers at predetermined pitches, and a wire is successively wound around the annular grooves between the working rollers. Further, the wire is advanced at a predetermined amount by a normal rotation of the motor and alternatively the wire is retracted at a given amount smaller than the above-mentioned predetermined amount by the reverse rotation of the motor in response to a control signal from a control portion, so that the wire as a whole is advanced step by step. At this time, a water slurry or an oil slurry containing float abrasive grains is supplied to a portion on the wire, and in this state, the work is pressed to and brought into contact with the wire, so that the work in the form of an ingot is cut/sliced to a wafer shape.

In accordance with the wire saw of this kind, a cutting efficiency of more work is generally improved as the slurry containing the float abrasive grains is supplied to a portion between the wire and the work and cutting chips are more smoothly discharged therefrom. Accordingly, there has been suggested a wire saw which can smoothly supply the slurry and discharge the chips by inclining the wire with respect to the cutting surface of the work.

However, in the conventional wire saw, as shown in FIG. 1, it is supposed that a wire 101 is inclined such that two points A and B on a circle of a work 100 become a cutting start point in accordance with a movement of the wire 101. Then, as shown in FIG. 2, in the case that the wire 101 moves from a left side to a right side, a portion adjacent to the cutting start point A is cut at a degree more than a diameter of the wire 101 by a sufficient amount of slurry containing the float abrasive grains supplied to the portion on the wire 101, and a portion after a middle portion in the cutting direction of the work 100 is in a state of having insufficient slurry. Further, in the case that the wire 101 moves from the right side to the left side, a portion adjacent to the cutting start point B is cut at a degree more than a diameter of the wire 101 by a sufficient amount of slurry containing the float abrasive grains supplied to the portion on the wire 101, and a portion after a middle portion in the cutting direction of the work 100 is in a state of having insufficient slurry. Accordingly, both surfaces of a cut wafer 102 become convex surfaces at the middle portion, so that there are problems that it is hard to obtain the wafer 102 having a predetermined uniform thickness and a working accuracy is lowered.

SUMMARY OF THE INVENTION

The present invention is made for solving the problems existing in the prior art, and an object of the invention is to provide a wire saw which can improve a working accuracy for cutting.

The above-mentioned object can be solved by a wire saw according to the present invention comprising:

a plurality of working rollers rotatable in a normal direction and a reverse direction which is opposed to the normal direction;

a wire wound between the plurality of working rollers;

a slurry supplying means for supplying a slurry containing abrasive grains onto the wire;

a work feeding means for bring a work into contact with the wire so as to cut the work with the wire; and an inclining means for swingably inclining one of a work and the wire which is wound between the working rollers relative to a line perpendicular to a work feeding direction, wherein the wire and the work are relatively and swingably inclined in such a manner that a cutting start point (C) of the work in accordance with a movement of the wire becomes an inside point which is other than an outer periphery of the work after starting the cutting operation.

In order to achieve the object mentioned above, in accordance with the invention, there is also provided a wire saw structured such as to move a wire wound between a plurality of working rollers to a normal direction and a reverse direction, to relatively incline the wire and a work, to supply a slurry containing abrasive grains onto the wire, and to bring the work into contact with the wire so as to cut the work, wherein the wire and the work are relatively inclined in such a manner that a cutting start point of the work in accordance with a movement of the wire becomes an inside point which is other than an outer periphery of the work.

The above-mentioned object can also be attained by a wire saw, according to the present invention, structured so as to move a wire wound between a plurality of working rollers to a normal direction and a reverse direction, to relatively incline the wire and a work by an inclining mechanism, to supply a slurry containing abrasive grains onto the wire, and to bring the work into contact with the wire so as to cut the work, wherein a moving direction of the wire is controlled, and control means for controlling the inclining mechanism such that the wire and the work are relatively inclined in such a manner that a cutting start point of the work becomes an inside point which is other than an outer periphery of the work at a time of switching the moving direction of the wire is provided.

Furthermore, the above-mentioned object can be achieved by a work cutting method according to the present invention, in a wire saw comprising: a plurality of working rollers rotatable in a normal direction and a reverse direction which is opposed to the normal direction; a wire wound between the plurality of working rollers; a slurry supplying means for supplying a slurry containing abrasive grains onto the wire; a work feeding means for bringing a work into contact with the wire so as to cut the work with the wire; and an inclining means for swingably inclining one of a work and the wire which is wound between the working rollers relative to a line perpendicular to a work feeding direction, the work cutting method comprising the steps of:

swingably inclining one of the wire and the work relative to the other, wherein the swingably inclining step is conducted in such a manner that a cutting start point of the work in accordance with a movement of the wire becomes an inside point which is other than an outer periphery of the work after starting a cutting operation.

In addition, in accordance with the present invention, the object can also be achieved by a work cutting method structured so as to move a wire, wound between a plurality of working rollers is a normal direction and a reverse direction, to relatively incline the wire and a work, to supply a slurry containing abrasive grains onto the wire, and to bring the work into contact with the wire so as to cut the work, wherein the wire and the work are relatively inclined in such a manner that a cutting start point of the work in accordance with a movement of the wire becomes an inside point which is other than an outer periphery of the work.

Further, the above-mentioned object can be achieved in accordance with a work cutting method, according to the present invention, structured so as to move a wire wound between a plurality of working rollers in a normal direction and a reverse direction, to relatively incline the wire and a work by an inclining mechanism, to supply a slurry containing abrasive grains onto the wire, and to bring the work into contact with the wire so as to cut the work, wherein a moving direction of the wire is controlled, and the inclining mechanism is controlled such that the wire and the work are relatively inclined in such a manner that a cutting start point of the work becomes an inside point which is other than an outer periphery of the work at a time of switching the moving direction of the wire.

In this case, in an embodiment mentioned below, "control means" described in the claims and the description of the invention corresponds to a control portion 35, and "an inclining mechanism" similarly corresponds to a rotating member 31 and a rotating motor 32.

BRIEF DESCRIPTION OF THE DRAWINGS

FIG. 9 is a cross-section of a modified rotating member provided with three rollers;

FIG. 10 is a plan view of the modified rotating member provided with three rollers; and FIG. 11 is a cross-section of an another modified rotating member provided with three rollers.

DESCRIPTION OF THE PREFERRED EMBODIMENTS

An embodiment embodying the present invention will be described below with reference to FIGS. 3 to 8.

Figure 1:
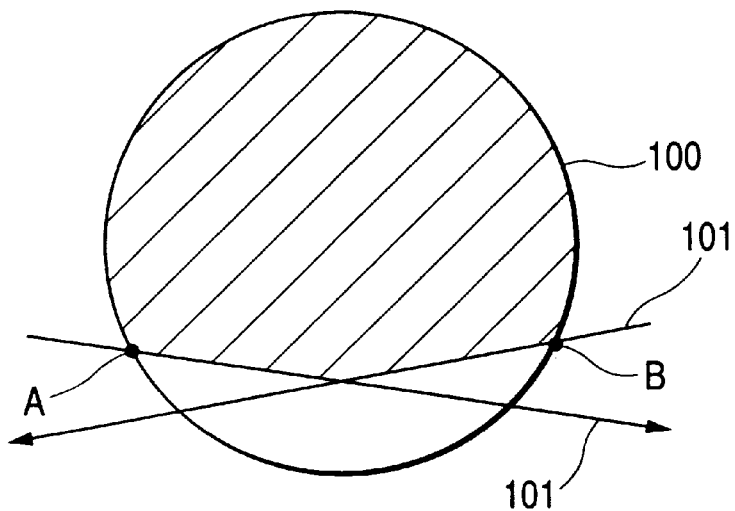
FIG. 1 is a cross sectional view in a cutting plane of the work in accordance with the prior art.
Figure 2:
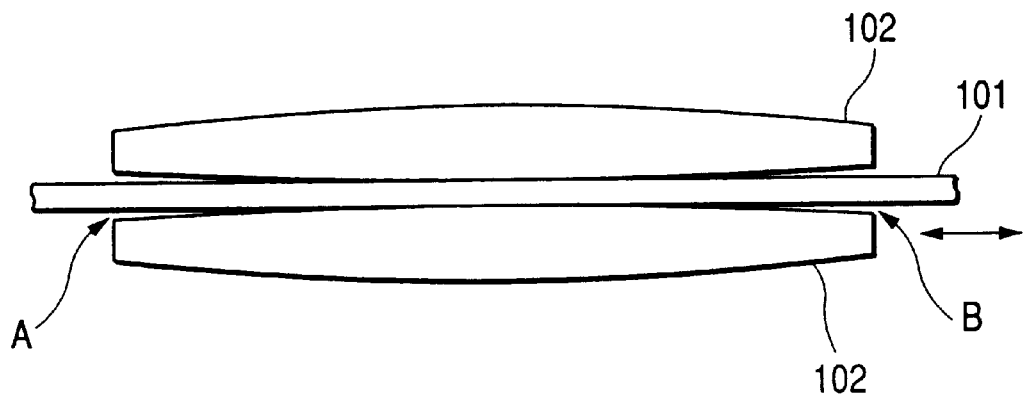
FIG. 2 is a partly plan view which shows a cutting process of the work in accordance with the prior art.
Figure 3:
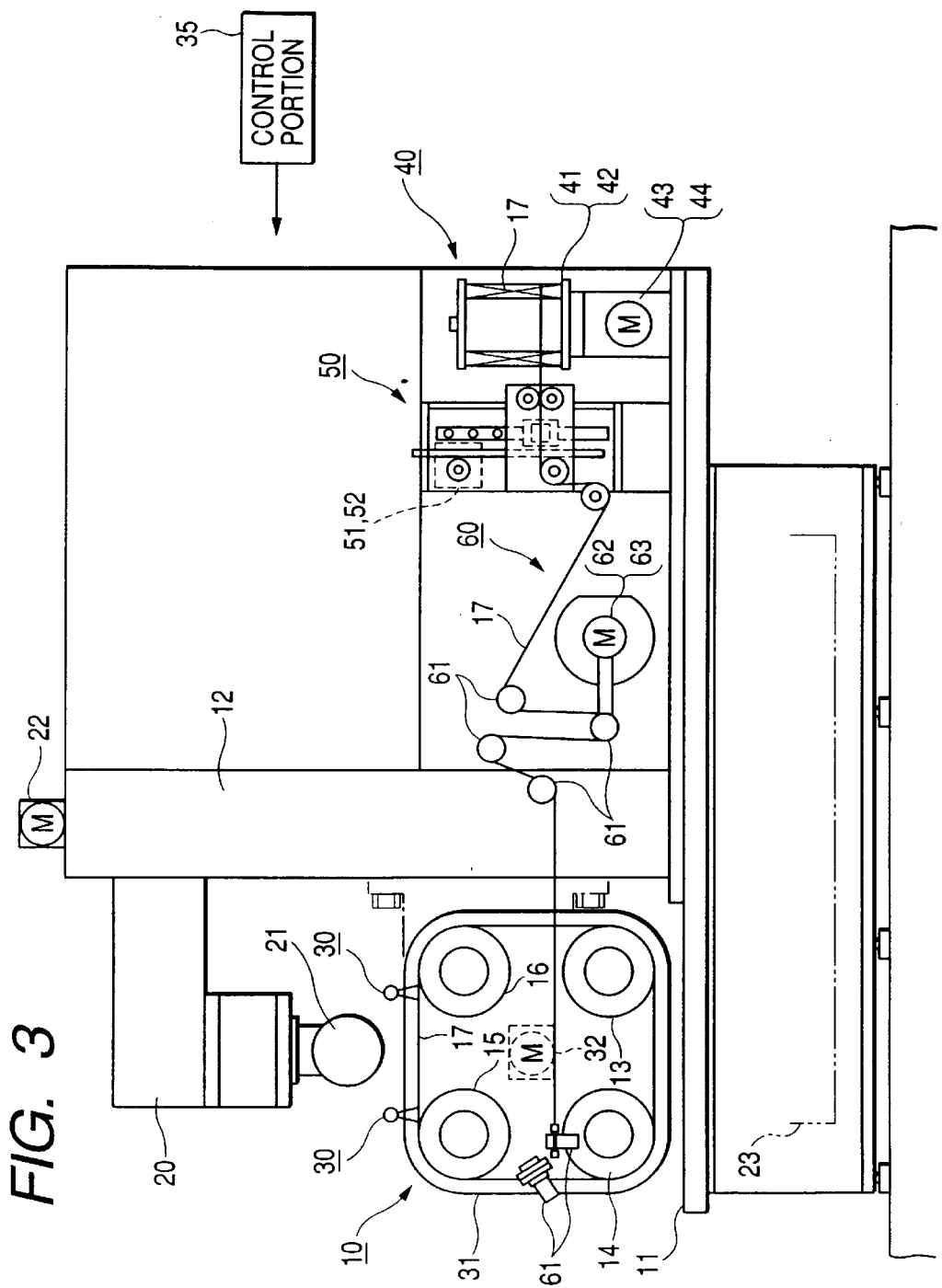
FIG. 3 is a front elevational view of a wire saw which shows a first embodiment of the invention.
Figure 4:
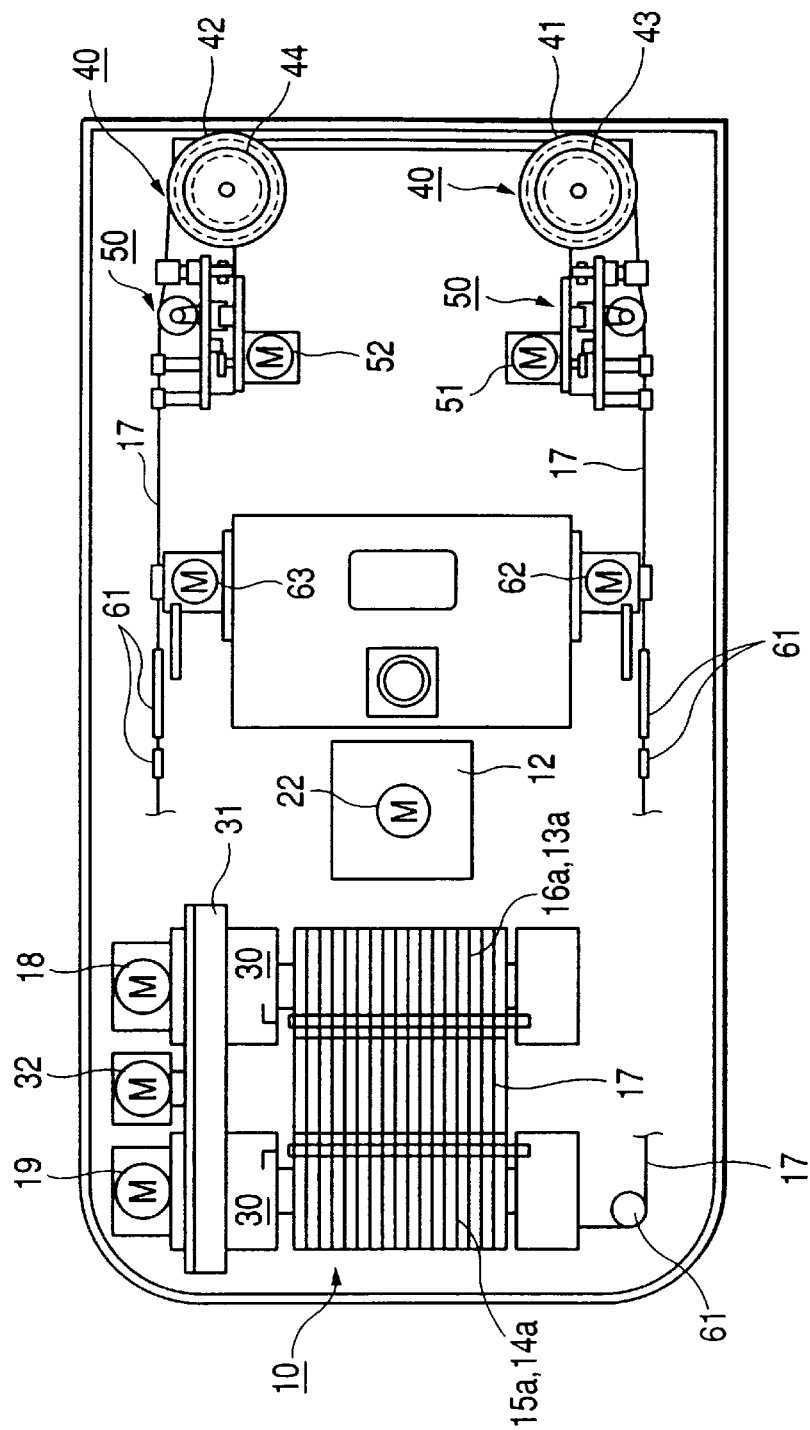
FIG. 4 is a plan view of the wire saw.
Figure 5:
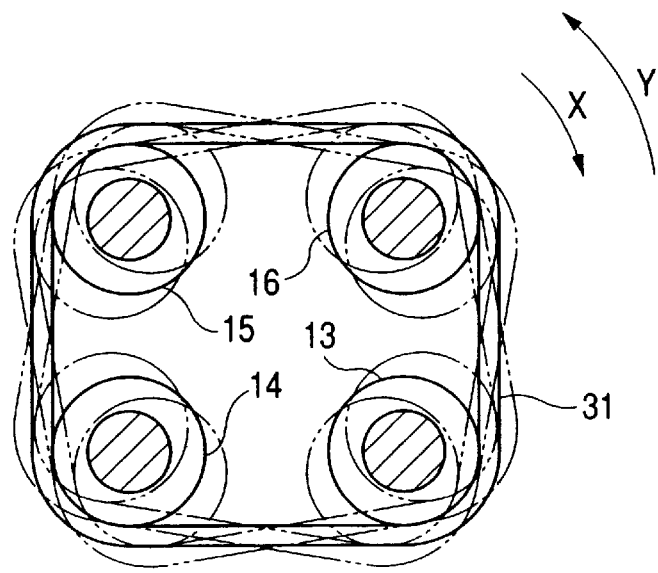
FIG. 5 is a front elevational view which shows an inclining mechanism.
Figure 6:
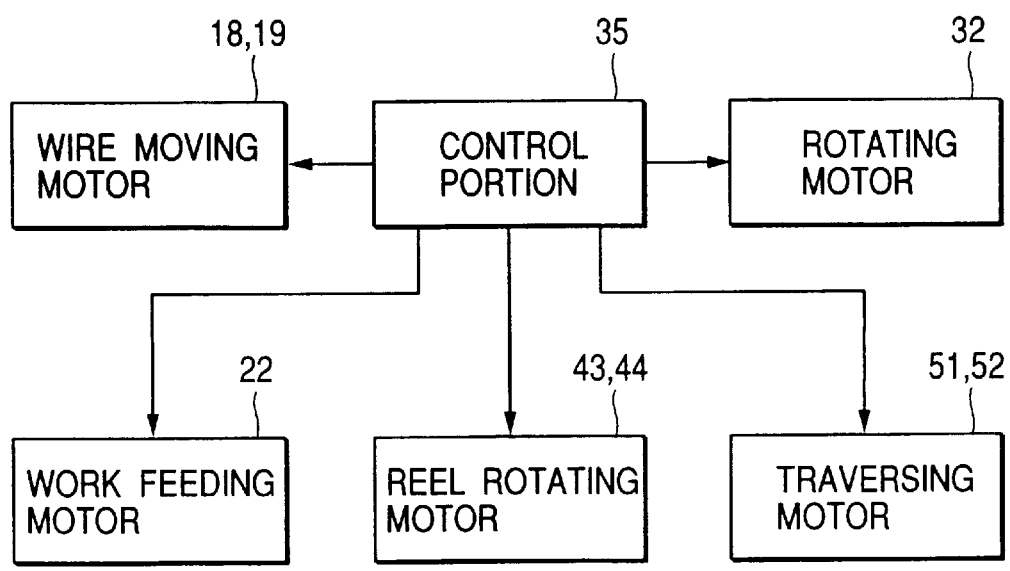
FIG. 6 is a block diagram which shows an electric structure.

As shown in FIGS. 3 and 4, a cutting mechanism 10 is provided in a column 12 disposed on an apparatus base table 11 in a standing manner. The cutting mechanism 10 is provided with a rotating member 31 which is rotated to a clockwise direction X and a counterclockwise direction Y by a rotating motor 32, as shown in FIG. 5. The rotating member 31 is provided with working drive rollers 13 and 14 and working driven rollers 15 and 16 extending in parallel with each other, and annular grooves 13a to 16a are formed on the outer periphery thereof at a predetermined pitch. In this case, in order to facilitate the understanding, the annular grooves 13a to 16a are described in the drawings in such a manner as to reduce a number thereof in comparison with an actual number.

A wire 17 constituted by a single wire material is continuously wound around each of the annular grooves 13a to 16a of the working rollers 13 to 16. Motors 18 and 19 for moving the wire 17 are disposed on the apparatus base table 11, and when the working drive rollers 13 and 14 are directly rotated by the motors 18 and 19, the working driven rollers 15 and 16 are rotated through the wire 17. Then, the wire 17 is moved to a normal direction (an advancing direction) and a reverse direction (a retracting direction) at a predetermined moving speed by a rotation of these working rollers 13 to 16. The movement of the wire 17 is performed such that an advance for a predetermined amount (for example, 10 m) and a retraction for a given amount (for example, 9 m) which is smaller than the predetermined amount are repeated, thereby totally advancing step by step.

Figure 7:
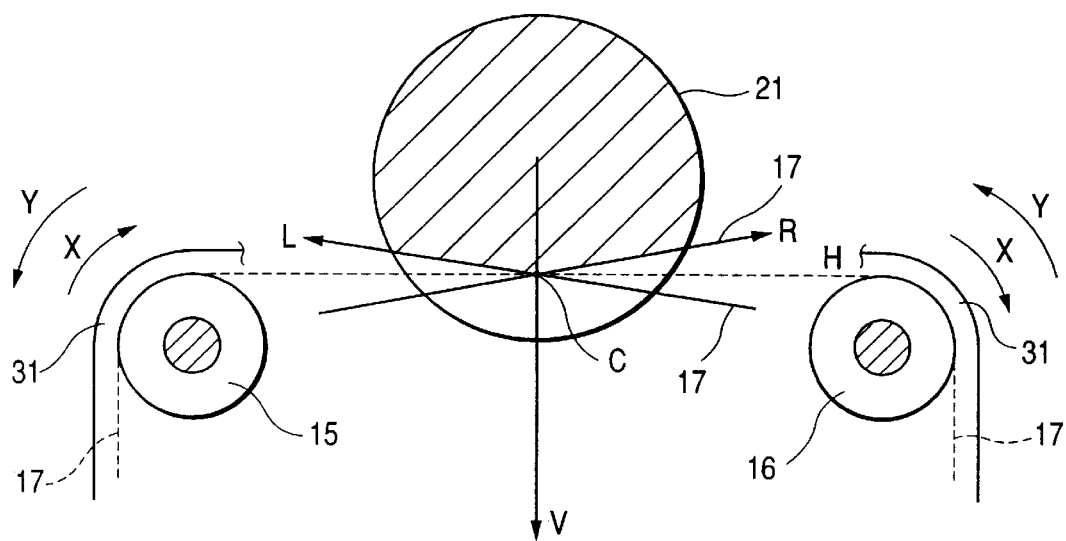
FIG. 7 is a cross sectional view in a cutting plane of the work.
Figure 8:
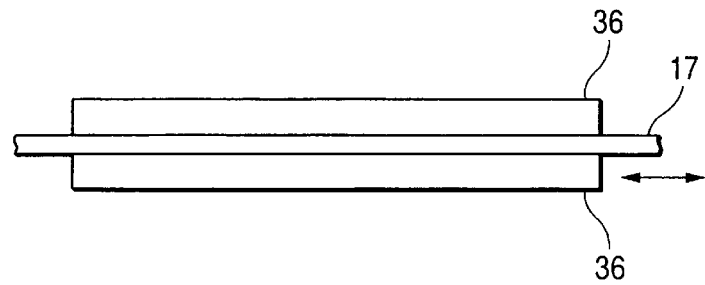
FIG. 8 is a partly plan view which shows a cutting process of the work.

Further, in FIG. 5, when the rotating member 31 is rotated from a reference position indicated by a solid line to a clockwise direction X or a counterclockwise direction Y, the wire 17 is inclined to a left direction or a right direction, as shown in FIG. 7. Namely, suppose that the work 21 is fed in a vertical direction V and the wire 17 guided between the working driven roller 15 and 16 is extended and moved along a horizontal direction H in the reference position of the rotating member 31, a line (L or R) defined by the wire 17 can be inclined relative to a line perpendicular to the vertical direction V and the horizonal direction H in accordance with the rotation of the rotating member 31 in the clockwise or counterclockwise direction.

In order to be positioned above the cutting mechanism 10, a work supporting mechanism 20 is supported to the column 12 provided on the apparatus base table 11 in a standing manner in such a manner as to vertically move, and a work 21 made of a hard and brittle material is detachably set in a lower portion thereof. A motor 22 for ascending and descending the work is disposed on the column 12, and the work supporting mechanism 20 is vertically moved through a ball screw (not shown) by the motor 22.

A slurry storage tank 23 stores a water slurry or an oil slurry containing float abrasive grains (for example, SiC), and is housed in the lower portion of the apparatus base table 11.

A pair of slurry supplying mechanisms 30 are disposed above the cutting mechanism 10 in an opposing manner, extend in parallel to the working rollers 15 and 16, and are positioned in both sides in front of and at the rear of the work 21 respectively.

Then, at a time of operating the wire saw, the work supporting mechanism 20 is descended toward the cutting mechanism 10 while the wire 17 is moved between the working rollers 13 to 16 of the cutting mechanism 10. At this time, the work 21 is pressed to and brought into contact with the wire 17 as well as the slurry within the slurry storage tank 23 is supplied to the portion on the wire 17 through the slurry supplying mechanisms 30, so that the work 21 is sliced to a wafer shape by a lapping effect.

A reel mechanism 40 is provided on the apparatus base table 11, and is provided with a draw-out reel 41 for drawing out the wire 17 and a take-up reel 42 for taking up the wire 17. A pair of reel rotating motors 43 and 44 constituted by a servo motor capable of changing a rotational direction and a rotational speed are disposed in the apparatus base table 11, and the reels 41 and 42 are connected to the motor shafts thereof through a transmitting mechanism (not shown).

A traverse mechanism 50 is provided on the apparatus base table 11 in an adjacent manner to the reel mechanism 40, and guides the drawing-out of the wire 17 from the draw-out reel 41 and the taking-up of the wire 17 to the take-up reel 42 by traversing motors 51 and 52 with vertically traversing. Then, the worked wire 17 is taken up to the take-up reel 42 as well as the wire 17 is drawn out to the cutting mechanism 10 from the draw-out reel 41 in accordance with the rotation of both the reels 41 and 42 of the reel mechanism 40.

A tension applying mechanism 60 is disposed between the reel mechanism 40 and the cutting mechanism 10. Then, both ends of the wire 17 wound between the working rollers 13 to 16 of the cutting mechanism 10 are hooked to the tension applying mechanism 60 through each of the guide rollers 61. In this state, a predetermined tension is applied to the wire 17 between the working rollers 13 to 16 by tension applying motors 62 and 63 of the tension applying mechanism 60.

A control portion 35 serving as control means is provided within a control table (not shown), and controls a rotation (a direction of rotation and a number of rotation) of each of the wire moving motors 18 and 19, the work ascending and descending motor 22, the reel rotating motors 43 and 44, the traversing motors 51 and 52, and the rotating motor 32. In accordance with this embodiment, the control portion 35 rotates the rotating motor 32 synchronously with the switching of the rotational direction of the wire moving motors 18 and 19, and inclines the wire 17 together with the rotating member 31 relative to the work feeding direction in such a manner that a cutting start point of the work 21 in accordance with the advance of the wire 17 becomes a point C within the work 21. The cutting operation is proceeded in such a manner that the point C is preferably kept maintained in a point which is contained in a imaginary line extending in a work feeding direction (that is, in the vertical direction V in FIG. 7).

Next, an operation of the wire saw structured in the above manner will be described below.

The work 21 is brought into contact with the wire 17 in accordance with a descent of the work supporting mechanism 20, so that the cutting of the work 21 is started. At this time, the wire 17 is normally or reversely rotated by the moving motors 18 and 19, and is totally advanced step by step. Accordingly, the wire 17 temporarily stops after being advanced (normally rotated) at a predetermined amount by the moving motors 18 and 19, and then is retracted (reversely rotated) at a given amount.

When the rotating member 31 is rotated from a position shown by a solid line in FIG. 5 to a counterclockwise direction by the rotating motor 32, the wire 17 goes to a rightward direction R in FIG. 7 by the rotation of the moving motors 18 and 19, and the wire 17 is inclined in such a manner as to be moved from the inner portion of the work 21 to the right and outer periphery, as shown in FIG. 7. As a result, the cutting start point of the work 21 becomes the point C within the work 21. Then, the work 21 is cut from the cutting start point C by a sufficient slurry containing the float abrasive grains supplied to the portion on the wire 17.

Further, when the rotating member 31 is rotated from a position shown by a solid line in FIG. 5 to a clockwise direction by the rotating motor 32, the wire 17 goes to a leftward direction L in FIG. 7 by the rotation of the moving motors 18 and 19, and the wire 17 is inclined in such a manner as to be moved from the inner portion of the work 21 to the left and outer periphery, as shown in FIG. 7. As a result, the cutting start point of the work 21 similarly becomes the point C within the work 21. Then, the work 21 is cut from the cutting start point C by a sufficient slurry containing the float abrasive grains supplied to the portion on the wire 17. Accordingly, both the surfaces of the cut wafer 36 become a flat surface, and it is prevented that the middle portion becomes a convex surface, so that the wafer 36 having a predetermined uniform thickness can be obtained.

As mentioned above, in accordance with this embodiment, the following effects can be obtained.

The wire 17 is inclined in such a manner that the cutting start point of the work 21 becomes the point C within the work 21 other than the circumference, so that the work can be cut from the inner portion and the cutting accuracy of the wafer 36 can be improved.

Since the wire 17 is guided by the cut portion of the work 21 so as to cut the work 21 from the inner portion, a cutting crack due to an excessive supplied slurry generated on the outer periphery of the work 21 can be reduced.

Since the control portion 35 is structured in such a manner as to rotate the rotating motor 32 synchronously with the switching of the rotational direction of the wire moving motors 18 and 19, a timing of inclining the wire 17 can be easily and securely set such that the cutting start point of the wire 21 becomes the point C within the work 21.

The embodiment mentioned above can be modified in the following manner.

The embodiment mentioned above, it is structured such that the working drive rollers 13 and 14 and the working driven rollers 15 and 16 are provided in the rotating member 31 and the wire 17 is inclined by rotating the rotating member 31, however, the structure is not limited to this. Instead an optional mechanism which can relatively inclines the wire 17 and the work 21 can be employed.

The embodiment mentioned above, is structured such that the rotating member 31 is provided in the cutting mechanism 10 so as to incline the wire 17. Alternatively it can be structured such that the inclining mechanism is provided in the work supporting mechanism 20 so as to incline the work 21 with respect to the wire 17.

The cutting mechanism 10 can be constituted by structure other than four rollers, that is, by three rollers or two rollers as shown in FIGS. 9, 10 and 11. In this case, as shown in FIGS. 9 and 11, a working drive roller 64 and working driven rollers 65 and 66 are supported to the rotating member 31, and the wire 17 is inclined by rotating them around a substantially center portion P0 by means of the rotating motor 32.

Further, as shown in FIGS. 10 and 11, the rotating member 31 can be rotated around a center P1 of the working drive roller 64.

Still further, with respect to the technical idea understood from this embodiment other than the claims will be described below together with the effect thereof.

There is provided a wire saw according to the present invention, wherein a moving motor for normally and reversely rotating the plurality of working rollers is provided, and the control means switches and controls a moving direction of the wire by switching the rotational direction of the moving motor.

When the structure is made in the above manner, the control means can easily and securely set an inclining timing of the wire in such a manner that the cutting start point of the work becomes a point within the work.

In accordance with the present invention, the cutting is started from the inside point other than the outer periphery of the work, a wire saw in which the cut surface becomes a flat surface and a working accuracy for cutting is improved can thus be provided.

In accordance with the present invention, since the cutting is started from the inside point other than the outer periphery of the work, the cut surface becomes a flat surface and a working accuracy for cutting can be improved.

While the present invention has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A wire saw comprising:
   a plurality of working rollers (15, 16; 65, 66) rotatable in a normal direction and a reverse direction which is opposite to said normal direction;
   a wire (17) wound between said plurality of working rollers (15, 16; 65, 66);
   a slurry supplying means (30) for supplying a slurry containing abrasive grains onto said wire;
   a work feeding means (22) for bringing a work (21) into contact with the wire (17) so as to cut said work with said wire; and
   an inclining means (31) for swingably inclining one of a work and the wire which is wound between said working rollers relative to a line (H) perpendicular to a work feeding direction (V); and a control portion which controls said inclining means and said plurality of working rollers so that
   said wire and said work are relatively and swingably inclined by said inclining means, when said plurality of working rollers are temporarily stopped, so that the work is cut, in accordance with a movement of the wire, along at least one straight line beginning at a cutting start point (C) which is an inside point other than at an outer periphery of said work after starting the cutting operation.

2. The wire saw according to claim 1, wherein said inclining means (31) comprises a rotating member (31), on which said working rollers are rotatably supported, for swingably inclining said wire wound between said working rollers relative to said line.

3. The wire saw according to claim 1, further comprising:
   a controlling means (35) for controlling a moving direction of said wire and also for controlling said inclining means such that a cutting start point (C) of said work becomes an inside point which is other than an outer periphery of said work at a time of switching the moving direction of said wire.

4. A work cutting method for a wire saw comprising: a plurality of working rollers (15, 16; 65, 66) rotatable in a normal direction and a reverse direction which is opposed to said normal direction; a wire (17) wound between said plurality of working rollers (15, 16; 65, 66); a slurry supplying means (30) for supplying a slurry containing abrasive grains onto said wire; a work feeding means (22) for bringing a work (21) into contact with the wire (17) so as to cut said work with said wire; and an inclining means (31) for swingably inclining one of a work and the wire which is wound between said working rollers relative to a line (H) perpendicular to a work feeding direction (V), said work cutting method comprising the steps of:
   swingably inclining one of said wire and the work relative to the other, when said plurality of working rollers are temporarily stopped,
   wherein said swingably inclining step is conducted so that the work is cut, in accordance with a movement of the wire, along at least one straight line beginning at a cutting start point which is an inside point other than at an outer periphery of said work after starting a cutting operation.

5. The work cutting method according to claim 4 further comprising the steps of:
   controlling a moving direction of said wire and also said inclining mechanism in such a manner that a cutting start point of the work becomes an inside point which is other than an outer periphery of said work at a time of switching the moving direction of said wire.

6. The wire saw according to claim 1, wherein said inclining means (31) swingably inclines one of a work and said wire so that a cutting start point (C) of the work in accordance with a movement of the wire becomes only an inside point which is other than an outer periphery of said work after starting the cutting operation.

7. The work cutting method as set forth in claim 4, wherein said step of swingably inclining further includes inclining one of said wire and the work relative to the other so that a cutting start point of the work in accordance with a movement of the wire becomes only an inside point which is other than an outer periphery of said work after starting a cutting operation.

8. A wire saw comprising:
   a rotating member which rotates in clockwise and counterclockwise directions;
   a plurality of working rollers, mounted to said rotating member, and rotatable in clockwise and counterclockwise directions relative to said rotating member;
   a wire wound between said plurality of working rollers;
   a work support for holding a work, said work support being movable relative to said wire; and
   a control portion which controls said rotating member and at least one of said plurality of working rollers so that said rotating member rotates when said plurality of working rollers are temporarily stopped, and so that after said rotating member rotates in the clockwise direction, said at least one of said plurality of working rollers rotates in the counterclockwise direction, and such that after said rotating member rotates in the counterclockwise direction said at least one of said plurality of working rollers rotates in the clockwise direction, whereby the work in said work support is cut along at least one straight line beginning at a cutting start point which is an inside point other than at an outer periphery of the work after starting a cutting operation.

9. The wire saw according to claim 8, further comprising a slurry supplying mechanism mounted adjacent to said wire so as to supply a slurry containing abrasive grains to said wire.

10. The wire saw according to claim 8, wherein said control portion controls said rotating member and at least one of said plurality of working rollers so that when said rotating member rotates in the counterclockwise direction, said at least one of said plurality of working rollers rotates only in the clockwise direction, and such that when said rotating member rotates in the clockwise direction said at least one of said plurality of working rollers rotates only in the counterclockwise direction, whereby a cutting start point of work in said work support becomes an inside point only, which inside point is other than an outer periphery of the work after starting a cutting operation.

* * * * *